United States Patent
Gupta et al.

(10) Patent No.: US 7,266,127 B2
(45) Date of Patent: Sep. 4, 2007

(54) METHOD AND SYSTEM TO COMPENSATE FOR THE EFFECTS OF PACKET DELAYS ON SPEECH QUALITY IN A VOICE-OVER IP SYSTEM

(75) Inventors: Sunil K. Gupta, Edison, NJ (US); Chetan Vinchhi, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 949 days.

(21) Appl. No.: 10/068,023

(22) Filed: Feb. 8, 2002

(65) Prior Publication Data

US 2003/0152093 A1    Aug. 14, 2003

(51) Int. Cl.
*H04L 12/56* (2006.01)
(52) U.S. Cl. .................................. 370/413; 704/503
(58) Field of Classification Search ........ 370/229–235, 370/394, 412–429
See application file for complete search history.

(56) References Cited

U.S. PATENT DOCUMENTS

| 6,377,931 B1 * | 4/2002 | Shlomot | ................ 704/503 |
| 6,658,027 B1 * | 12/2003 | Kramer et al. | ............ 370/516 |
| 6,665,317 B1 * | 12/2003 | Scott | ..................... 370/516 |
| 6,683,889 B1 * | 1/2004 | Shaffer et al. | ............. 370/516 |
| 6,944,174 B1 * | 9/2005 | Chow | ....................... 370/413 |
| 6,956,828 B2 * | 10/2005 | Simard et al. | ............. 370/260 |

OTHER PUBLICATIONS

Michael R. Portnoff; "Time-Scale Moderation of Speech Based on Short-Time Fourier Analysis"; IEEE Transactions On Acoustics, Speech, And Signal Processing, vol. ASSP 29, No. 3; pp. 374-390; © Jun. 1981.

David Malah; "Time-Domain Algorithms for Harmonic Bandwidth Reduction and Time Scaling of Speech Signals"; IEEE Transactions On Acoustics, Speech, And Signal Processing, vol. ASSP 27, No. 2; pp. 121-133; © Apr. 1979.

* cited by examiner

*Primary Examiner*—Chi Pham
*Assistant Examiner*—Phuc Tran

(57) ABSTRACT

The system includes a jitter buffer for receiving speech packets in a Voice over Internet Protocol (VoIP) system, a playback device for adjusting the playback speed of the received speed packets, and a jitter buffer manager for detecting out of sequence packets in the jitter buffer and for sending commands to the playback device to adjust playback speed based on the detection. The speech signal is played back at the nominal speed when there are no out of sequence packets. The playback speed is decreased when an out of sequence packet is detected, thereby tending to increase the jitter buffer length. When an out of sequence packet arrives, the playback speed is increased in order to restore jitter buffer length to its nominal length.

22 Claims, 5 Drawing Sheets

METHOD AND SYSTEM TO COMPENSATE FOR THE EFFECTS OF PACKET DELAYS ON SPEECH QUALITY IN A VOICE-OVER IP SYSTEM

BACKGROUND OF THE INVENTION

1. Field of the Invention

The present invention generally relates to voice-over Internet Protocol (VoIP) systems and more particularly to a method and system for compensating for the effects of packet delays on perceived speech quality in a VoIP system.

2. Description of Related Art

Voice Over IP (VoIP) is short for Voice over Internet Protocol. It includes any technology that enables voice telephony over IP Networks. If VoIP is used in a private setting such as in an Intranet, or over a Wide Area Network (WAN), it is generally referred to as VoIP. If VoIP is transported over the public Internet, VoIP is generally referred to as Internet telephony.

Speech signals are transmitted over packet networks in a VoIP system. Due to real-time constraints on the delivery of speech signals, the perceived speech quality is susceptible to delayed arrival of packets. In a packet network, packets may arrive asynchronously, i.e. the exact arrival time of a packet can be significantly different from a nominal arrival time. Also, each packet may be subject to differing amounts of packet delay in the network. This variation in packet delay is called jitter. As a result of jitter, packets may arrive out of sequence at an end-point, wherein an end-point is a client in a server-client network, for example.

Packets arriving at the end-point are queued in a jitter buffer where they are placed back in sequence, if required. In a VoIP system, a jitter buffer is typically required wherever a speech packet stream is terminated. The purpose of the jitter buffer is to absorb jitter. Since packets arrive asynchronously, they are placed into the jitter buffer asynchronously, but the packets are removed from the jitter buffer synchronously, i.e. at fixed time intervals. The jitter buffer is typically permitted to grow to a certain size before packets are removed for processing. This size of the jitter buffer is referred to as the nominal length of the jitter buffer. Since packets are arriving at random time intervals, the instantaneous number of packets in the jitter buffer may be different from the nominal length. This different length may be referred to as the instantaneous length or jitter buffer length. The maximum length to which a jitter buffer may grow is referred to as the maximum size of the jitter buffer. The sequence of the incoming packets is monitored and if a missing (or out of sequence) packet is detected, a placeholder or NULL packet is created to take the out of sequence packet's place. If the missing packet arrives at a subsequent time, it may replace this NULL packet. If the missing packet has not arrived by the time it is supposed to be removed from the jitter buffer, a packet loss is declared by the VoIP system. These packet losses can result in significant degradation in the perceived speech quality at a receiver that is receiving these packets.

SUMMARY OF THE INVENTION

The present invention provides a method and system to compensate for packet delay in a Voice over Internet Protocol (VoIP) system. The system includes a jitter buffer. The jitter buffer may be embodied as a queue for receiving speech packets in the VoIP system. The system includes a variable-speed playback device for adjusting the playback speed of the received speech packets, and a jitter buffer manager for detecting packet jitter, and for sending commands to the playback device to adjust playback speed based on the detection.

In the system, the signal is played back at a nominal speed when there are no out of sequence packets. The playback speed is decreased when an out of sequence packet is detected. This tends to increase the length of the jitter buffer. When a delayed packet arrives, the playback speed is increased in order to restore the jitter buffer length to its nominal value.

The present invention is based upon an observation that human hearing is not very sensitive to small variations in the speed at which a speech signal is played back, so long as the pitch (i.e., fundamental frequency of the speech signal) is maintained. Variable Speed Playback (VSP) of speech signals is used to adjust the jitter buffer length, but the average jitter buffer length is kept relatively small. The jitter buffer length adjustment is transparent to the user. Hence, the perceived end-to-end delay is maintained as small as in a conventional VoIP system, which has a smaller jitter buffer length, while significantly improving the perceived speech quality.

BRIEF DESCRIPTION OF THE DRAWINGS

The present invention will become more fully understood from the detailed description given below and the accompanying drawings, wherein like elements are represented by like reference numerals, which are given by way of illustration only and thus are not limitative of the present invention and wherein.

DETAILED DESCRIPTION

The effects of packet delay may, in theory, be compensated by increasing the length of the jitter buffer. However, it is not possible to increase the jitter buffer length arbitrarily in a real-time environment. It is desirable to maintain the jitter buffer length small when packet jitter is low in order to minimize latency on a VoIP system. Accordingly, the present invention is based upon the observation that human hearing is not very sensitive to small variations in the speed at which a speech signal is played back, as long as the pitch (such as the frequency of vibration of the vocal chords) is maintained. Due to Variable Speed Playback (VSP) of speech in the system, the jitter buffer length may vary. However, the jitter buffer manager attempts to maintain jitter buffer length around the nominal value. Any jitter buffer length adjustment is transparent to the user and hence, the perceived end-to-end delay is maintained as small as in a conventional VoIP system, while significantly improving the perceived speech quality.

In the system, the signal is played back at a nominal speed when there are no out of sequence packets, i.e. when no NULL packets have been placed in the jitter buffer. The playback speed is decreased when an out of sequence packet is detected. This tends to increase the jitter buffer length. When the out of sequence packet arrives or is declared to be a lost packet by the system, the playback speed is increased in an attempt to restore the jitter buffer length to its nominal value.

Figure 1:
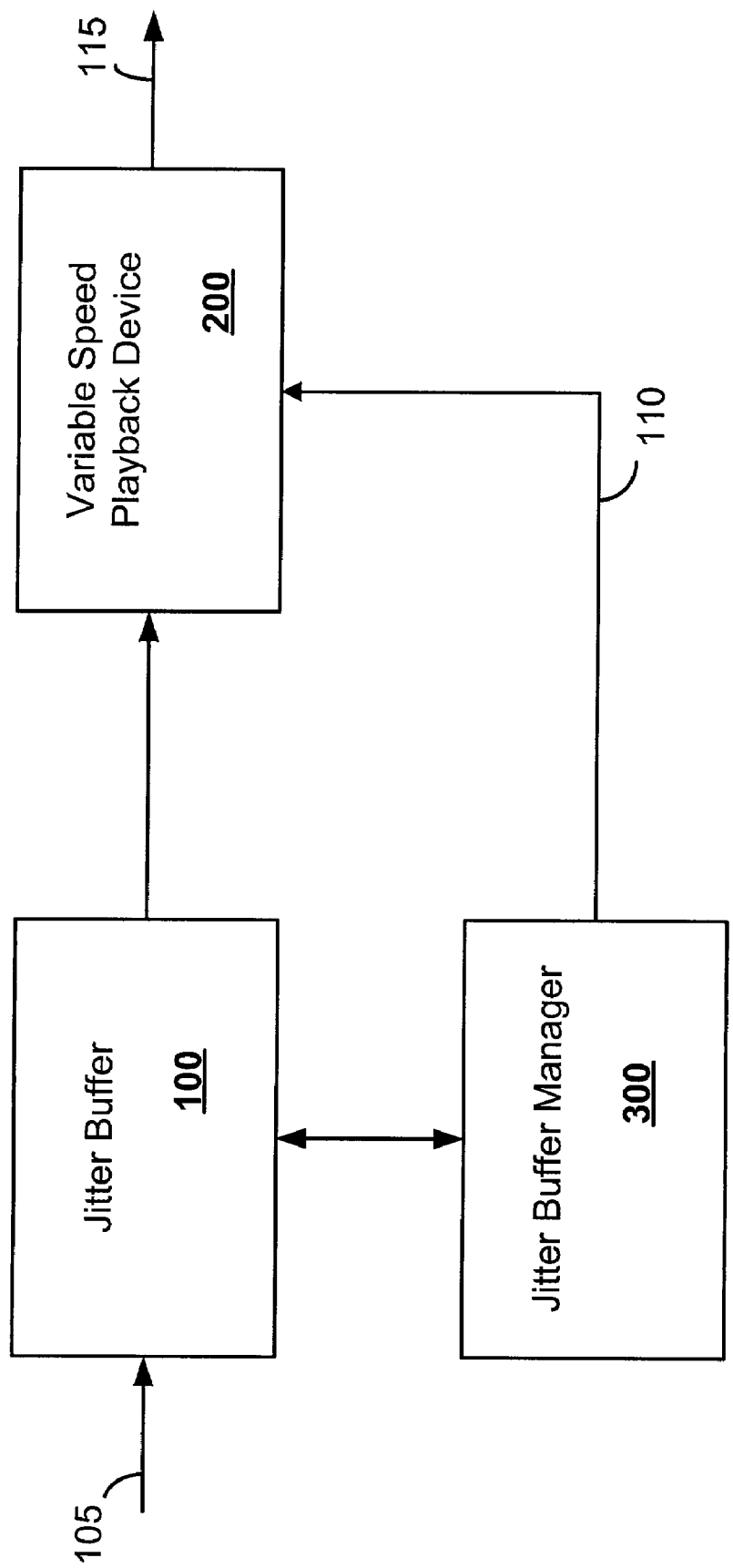
FIG. 1 illustrates a functional block diagram of the system in accordance with the invention.

FIG. 1 illustrates a functional block diagram of the system in accordance with the invention. As shown in FIG. 1, the system includes a jitter buffer 100, variable speed playback (VSP) device 200 and jitter buffer manager 300. Incoming speech packets are received at jitter buffer 100. Jitter buffer manager 300 monitors jitter buffer 100 and controls playback speed of VSP device 200 via path 110. Control of playback speed is based on the status of the jitter buffer 100. VSP device 200 receives speech packets 105 from jitter buffer 100, and plays back speech signals 115 representing speech packets 105. These speech signals 115 are transmitted to external receivers, external mediums, and/or other components in the VoIP system The jitter buffer 100 may be a queue for receiving incoming speech packets 105. The jitter buffer 100 is used to absorb jitter that is inherent in a VoIP system. As noted above, speech packets 105 may arrive out of sequence at the jitter buffer 100, and are placed back in the correct sequence at jitter buffer 100. When playback speed is decreased, the length of the jitter buffer 100 tends to increase. The jitter buffer length tends to decrease when the playback speed is increased.

The VSP device 200 may be embodied as any known or developing variable speed playback device known in the art. The VSP device 200 varies the playback speed of a speech signal by a specified amount using a method such as time-domain harmonic scaling or time-scale modification. A more detailed description of time-domain harmonic scaling can be found in an article by David Malah, entitled TIME-DOMAIN ALGORITHMS FOR HARMONIC BANDWIDTH REDUCTION AND TIME SCALING OF SPEECH SIGNALS, IEEE Transactions on Acoustics, Speech, and Signal Processing, vol. ASSP-27, N. 2, April 1979, the contents of which are incorporated by reference herein in their entirety. Additionally, time-scale modification is described in the article by Michael R. Portnoff, entitled TIME-SCALE MODIFICATION OF SPEECH BASED ON SHORT-TIME FOURIER ANALYSIS, IEEE Transactions on Acoustics, Speech, and Signal Processing, vol. ASSP-29, No. 3, June 1981, the contents of which are incorporated by reference herein in their entirety.

Figure 2:
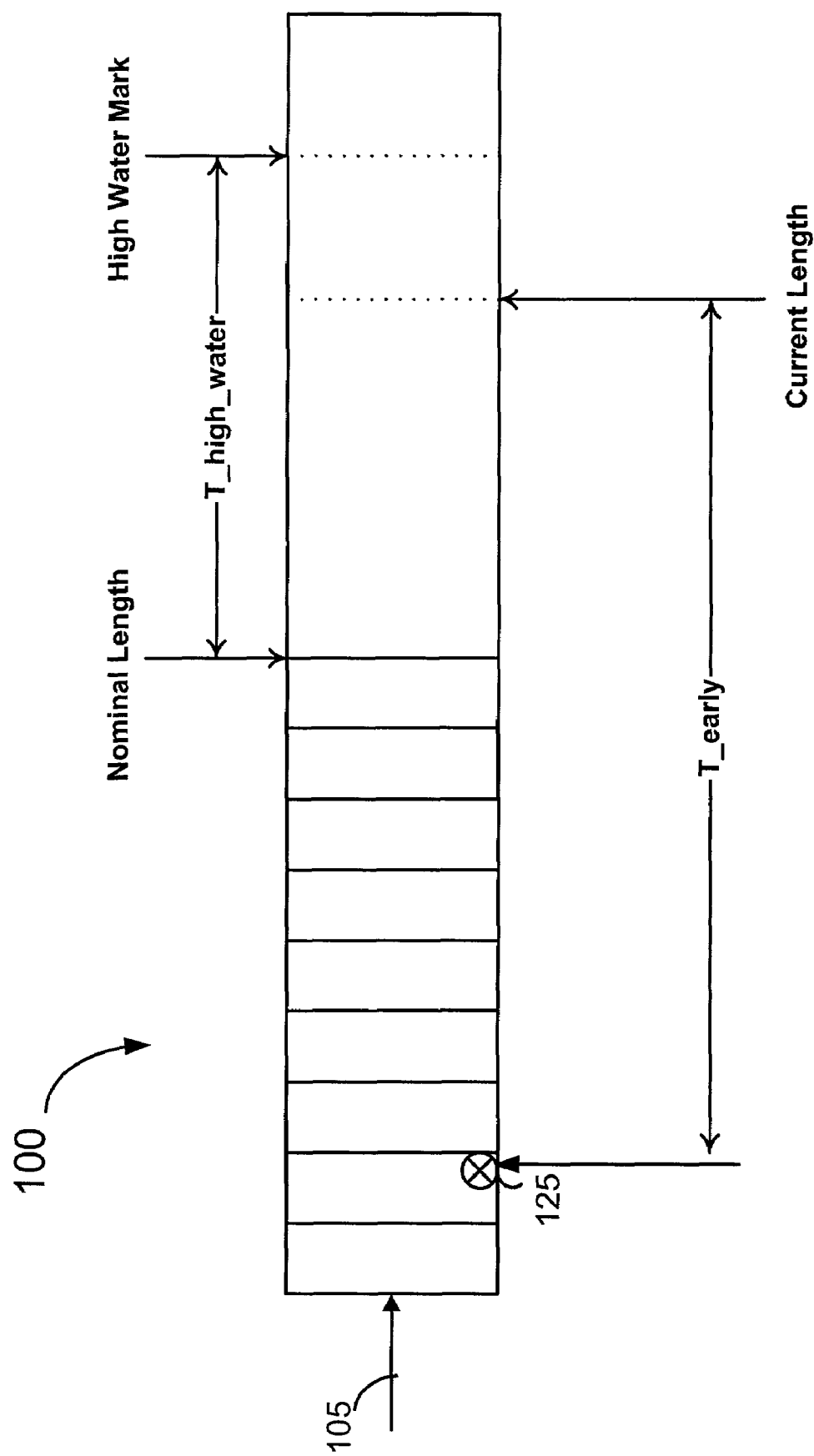
FIG. 2 illustrates attributes of jitter buffer 100 in accordance with the invention.

The buffer manager 300 may be embodied as an algorithm, application or process run by, or implemented in, a general purpose processor or microprocessor, a specialized processor such as a digital signal processor (DSP) or an application-specific integrated circuit (ASIC). The jitter buffer manager 300 and jitter buffer 100 may be further provided as a single component or circuit, or provided as separate components on substrate or surface of a chip, circuit or component FIG. 2 illustrates attributes of jitter buffer 100 in accordance with the invention. As seen in FIG. 2, the Nominal Length is the expected steady state length of the jitter buffer 100. The High Water Mark is a maximum length to which jitter buffer 100 is permitted to grow. The difference between the Nominal Length and the High Water Mark is termed T_high_water in FIG. 2. The actual maximum jitter buffer size can be higher than the High Water Mark if, for instance, the jitter buffer 100 has already reached the High Water Mark and a burst of packets arrives before the system has had time to reduce the jitter buffer length.

When an out of sequence packet is detected in the jitter buffer 100, a placeholder NULL packet is created in its place. The parameter T_early is defined as follows. When a NULL packet location 125 is more than T_early packets from the head of the jitter buffer 100 (i.e., the earliest packet in the jitter buffer 100) playback speed control can be disabled by jitter buffer manager 300. This feature may be used to prevent rapid changes in playback speed when the jitter buffer length is close to the High Water Mark.

Figure 3:
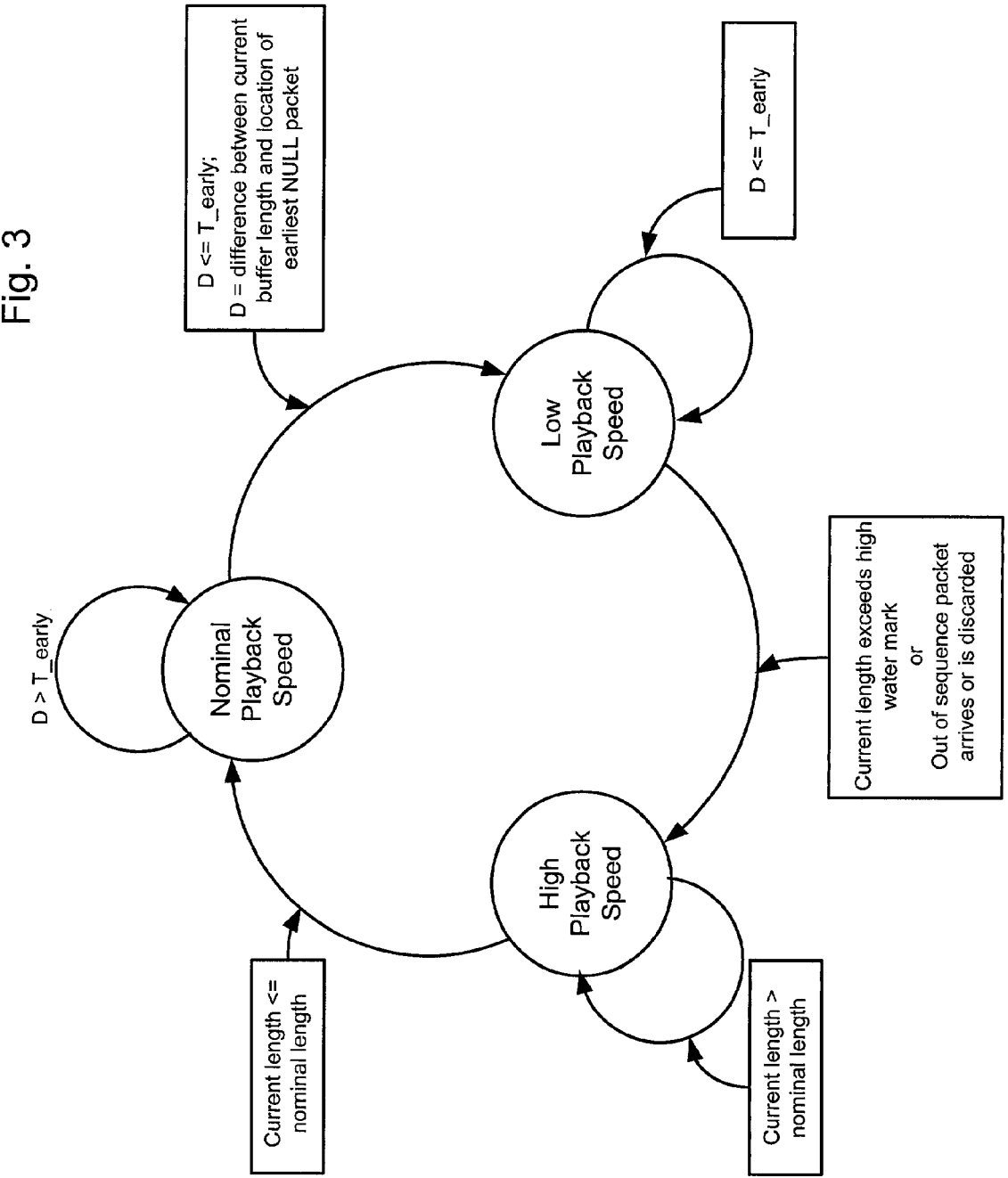
FIG. 3 illustrates a state-machine representation of operations performed on the playback device 200 in accordance with the invention.

FIG. 3 illustrates a state-machine representation of the control operations performed on the VSP device 200 by the jitter buffer manager 300. Each state corresponds to a playback speed. There are three possible speeds: Nominal, High and Low. The default speed is the nominal playback speed. As long as there are no NULL packets in the jitter buffer 100, or so long as all NULL packets are at least T_early packets away from the head of the jitter buffer 100, the playback speed remains unchanged. If the jitter buffer manager 300 detects a NULL packet within T_early packets of the head of the jitter buffer 100, the jitter buffer manager 300 sets the playback speed of the VSP device 200 to Low.

While the playback speed is Low, if a NULL packet is filled up by the delayed arrival of the out of sequence packet, or if the out of sequence packet is declared to be lost, the jitter buffer manager 300 sets the playback speed of the VSP device 200 to High in order to restore the length of jitter buffer 100 to its nominal length. The jitter buffer manager 300 also sets the playback speed of the VSP device 200 to High if the length of jitter buffer 100 reaches a High Water Mark. This is done to prevent the jitter buffer 100 from growing indefinitely in size.

The jitter buffer manager 300 maintains the playback speed of the VSP device 200 High as long as the length of jitter buffer 100 is larger than its nominal length. When the length of the jitter buffer 100 returns or decreases to its nominal length, the jitter buffer manager 300 sets the playback speed of the VSP device 200 to Nominal.

Figure 4:
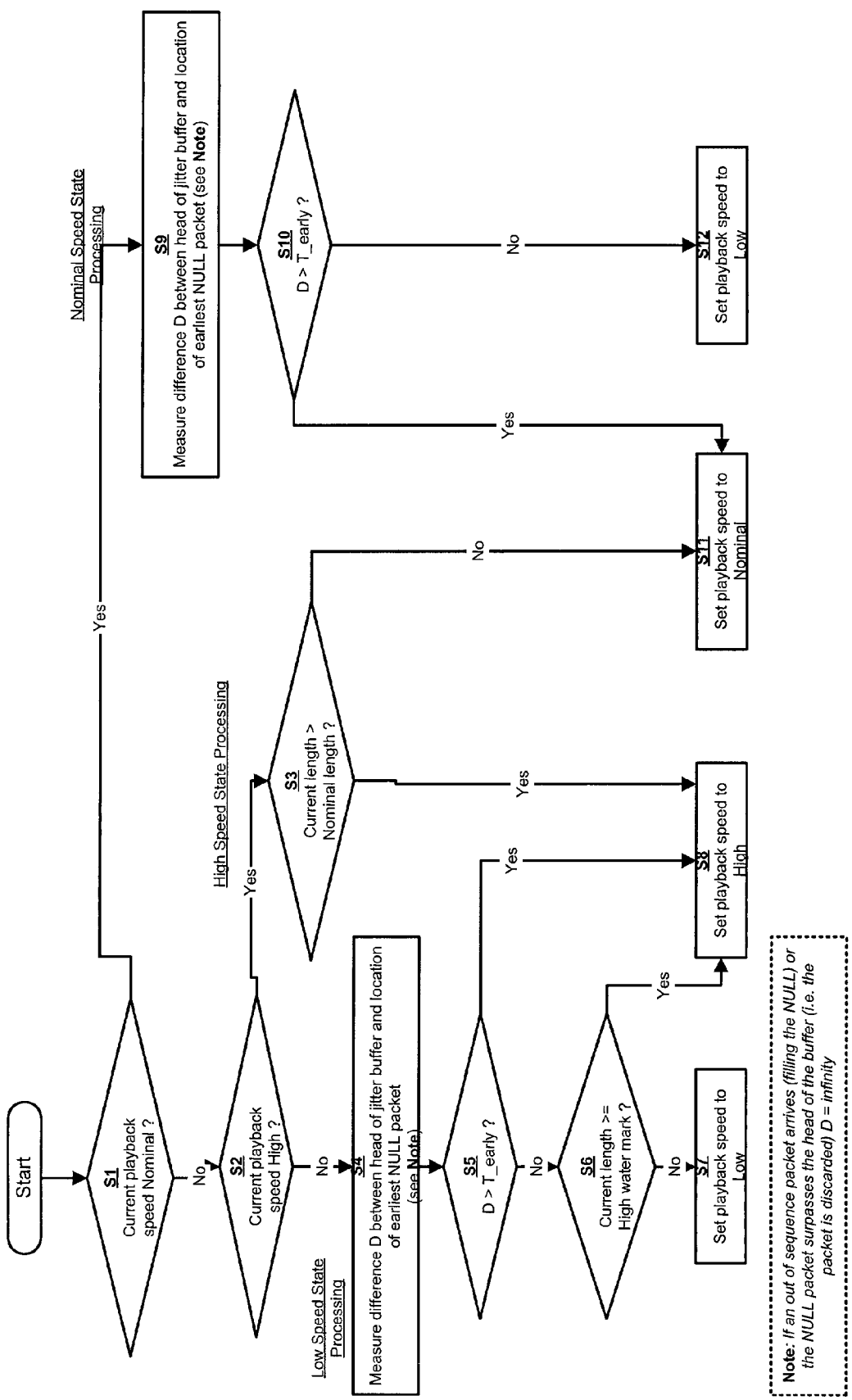
FIG. 4 illustrates a flow-chart of the operations performed by the jitter buffer manager 300 in accordance with the invention.

FIG. 4 illustrates operations performed by the jitter buffer manager 300. Initially, the jitter buffer manager 300 checks the current state (i.e. the current speed setting) of the VSP device 200. (Steps S1 and S2). If the current speed setting is Nominal, the jitter buffer manager 300 computes a difference D between the head of the jitter buffer 100 and the location of the earliest NULL packet (Step S9). If D is greater than T_early (Step S10), there is no state change, i.e. the playback speed remains Nominal (Step S11). If D is less than or equal to T_early, the jitter buffer manager 300 changes the playback speed of the VSP device 200 to Low (Step S12).

If the current speed setting is High, the current length of jitter buffer 100 is checked against the nominal length (Step S3). If the current length of jitter buffer 100 exceeds the nominal length, there is no state change, i.e. the playback speed is maintained High in VSP device 200 (Step S8). Otherwise, the jitter buffer manager 300 changes the playback speed of the VSP device 200 to Nominal (i.e. the current length of jitter buffer 100 has become equal to the nominal length) (Step S11).

If the current speed setting is Low, jitter buffer manager 300 computes a difference D between the head of the jitter buffer 100 and the location of the earliest NULL packet. (Step S4). If D is determined to exceed T_early (Step S5), the playback speed is set to High (Step S8). Otherwise, the current length of the jitter buffer 100 is checked against the High Water Mark (Step S6). If it has reached the High Water Mark, the playback speed is also set to High (Step S8). Otherwise, there is no state change, i.e. the playback speed is kept Low (Step S7). Accordingly, by intelligently varying the playback speed according to the above algorithm, additional time is allocated in the system for an out of sequence packet to arrive.

If silence suppression is used in the system, received silence intervals may also be used to adjust the length of jitter buffer 100 by controlling the playback speed. For instance, if the length of jitter buffer 100 is exceeding the Nominal Length when a silence period is detected, the buffer manager 300 controls the VSP device 200 so that playback may occur at the Nominal speed instead of the faster (High) speed. This effectively compresses the silence interval. When a new burst of speech packets arrives, the jitter buffer 100 is empty and the jitter buffer manager 300 instructs the VSP device 200 to start playing out the new speech packets at the Nominal speed.

Exemplary Applications

The system and method of the present invention have several possible applications. As noted earlier, a jitter buffer is required wherever a speech packet stream is terminated in a VoIP system, i.e., at an end-point. The system and method of the present invention may be utilized to alleviate the effects of packet delays at all such end-points. A few exemplary applications are briefly described.

The system and method may be used in a "Conferencing over IP" application. A conference is when a number of end-points or clients simultaneously participate in a conversation. Briefly, each client can listen to the speech transmitted by every other client in the conference. The mechanism that enables this multi-party conferencing is called a conferencing bridge.

Figure 5:
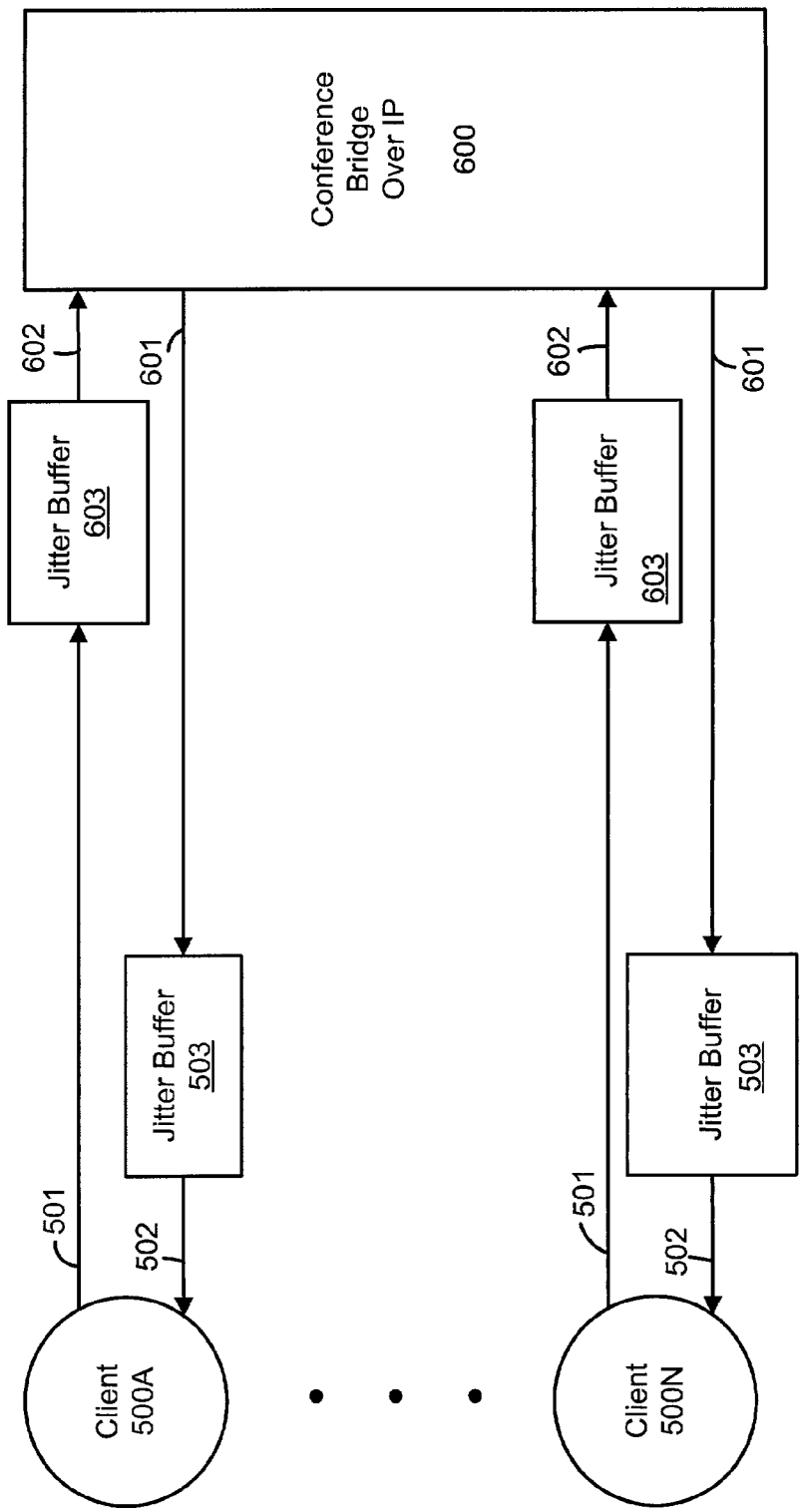
FIG. 5 illustrates an exemplary application performed by the system in accordance with the present invention.

FIG. 5 illustrates an exemplary conferencing over IP application using the system and method of the invention. In FIG. 5, there are a number of clients 500A-N participating in the conference. Each client 500 sends out a speech packet stream 501 that is terminated at the Conference Bridge 600. Each of these speech packet streams 501 has to pass through a jitter buffer 603 before the Conference Bridge 600 can process the speech signals 602. The Conference Bridge 600 mixes the speech signals 602 from all the clients 500A-N using mixing algorithms that are well-known in the art.

Conference Bridge 600 produces an outgoing speech packet stream 601 for each client 500. The client 500, now as an end-point, terminates this stream 601 so it has to pass through jitter buffer 503, to terminate at each client 500 as a speech signal 502. The system of the present invention would operate at the location of each jitter buffer 503 and 603, i.e. at the conference bridge 600 and at clients 500A-N.

Another application is in an IP-based Voice Messaging environment. Voice messages sent over IP are recorded and voice messages are played back over IP by this application. The system could reduce distortion due to packet delays while recording, as well as while performing playback functions.

A further application is in streaming a voice broadcast over internet. Streaming a voice broadcast over internet would include live web-cast of news, sports event coverage, company-wide speeches etc. A typical user application that terminates a streaming voice broadcast buffers up voice packets before beginning to play out the signal. In the event of network congestion, frequent re-buffering is required during which a number of packets are lost and the voice broadcast is interrupted. The system described in this invention could reduce the number of lost packets and therefore reduce the need for re-buffering.

Yet a further application of the method and system is within an Automatic Speech Recognition (ASR) over IP system. In a number of voice-enabled services or applications, voice recognition is performed on voice coming over IP. In this system, the end-user of the voice packet is not a human being, but an application. Packet delays result in packet losses, which may result in discontinuities and distortions in the speech signal. These distortions result in a degradation of the performance of ASR in the system. The system of the invention could be used to reduce the packet loss and hence the speech signal distortion. This may result in an improvement in the performance of the ASR over IP system.

Additionally, the system and method could be applied to E-mail reading over the internet, a feature which converts a text message into speech using a technology such as Text-To-Speech Synthesis (TTS). The TTS feature transmits the synthesized speech over IP. The system and method of the present invention would preferably operate at the end points, so as to reduce degradation of speech quality due to packet delay. The invention being thus described, it will be obvious that the same may be varied in many ways. For example, the functional blocks or steps in FIGS. 1-5 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

We claim:

1. A system to compensated for the effects of packet delay on a voice over internet protocol (VoIP) system, comprising:
a buffer for receiving speed packets in the VoIP system;
a playback device for adjusting the playback speed of the received speech packets; and
a buffer manager for detecting packet jitter in the buffer and for sending commands to the playback device to adjust playback speed based on the detection,
wherein the buffer manager measures a distance between an earliest detected out of sequence packet and a beginning of the buffer, and controls the playback device to increase or decrease the playback speed dependent on the measured distance.

2. The system of claim 1, wherein the buffer is a queue for handling incoming speech packets, the buffer performing jitter buffering and packet sequencing on the received speech packets.

3. The system of claim 1, wherein the buffer manager controls the playback device to decrease the playback speed when the buffer manager detects packet jitter that delays arrival of a speech packet.

4. The system of claim 3, wherein the buffer manager controls the playback device to increase the playback speed when the delayed packet arrives at the buffer.

5. The system of claim 3, wherein packet jitter is a variation in packet delay that causes packets to arrive out of sequence at an end-point in the system.

6. The system of claim 5, wherein an end-point is a client in the system.

7. The system of claim 5, wherein the buffer manager controls the playback device to decrease the playback speed when the distance between the earliest detected out of sequence packet and the beginning of the buffer is less than a given distance.

8. The system of claim 1, wherein the buffer manager checks length of the buffer and instructs the playback device to increase playback speed until the length of the buffer returns to a nominal length, when the buffer manager determines that length of the buffer exceeds a specified length.

9. The system of claim 1, wherein the buffer manager controls the playback device to decrease the playback speed when the distance is less than a given distance.

10. The system of claim 1, wherein the buffer manager includes silence compression means that uses silence periods that are received between speech packets in the buffer to restore the length of the buffer to a nominal length.

11. The system of claim 10, wherein the buffer manager compresses the silence periods to return playback speed to a nominal speed.

12. The system of claim 1, wherein the buffer manager controls the playback device to adjust speed by an amount that is dependent on an expected or observed packet jitter.

13. The system of claim 12, wherein packet jitter is a variation in packet delay that causes packets to arrive out of sequence at an end-point in the system.

14. The system of claim 13, wherein an end-point is a client in the system.

15. A method of compensating for the effects of packet delay on a voice over internet protocol (VoIP) system, comprising the steps of:
   detecting an amount of jitter in the arrival of speech packets;
   adjusting a playback speed of the speech packets based on the detection; and
   sending commands related to adjusting the playback speed to a playback device, wherein when the packet jitter is detected, a distance between an earliest detected out of sequence packet and a beginning of a buffer is measured, and the playback speed is increased or decreased dependent on the measured distance.

16. The method of claim 15, further comprising performing jitter buffering and packet sequencing on the speech packets prior to performing the detecting step.

17. The method of claim 15, wherein jitter is represented by an out of sequence packet, and wherein playback speed is decreased upon detection of an out of sequence packet, and increased upon arrival of the out of sequence packet.

18. The method of claim 17, wherein a length of a buffer storing the speech packets is checked against a specified length, and playback speed is increased until the length of the buffer returns to a nominal length, if the checked buffer length is less than the specified length.

19. The method of claim 17, wherein when one or more out of sequence packets are detected, a distance between the earliest detected out of sequence packet and the beginning of the buffer is measured, and playback speed is decreased when the measured distance between the earliest detected out of sequence packet and the beginning of the buffer is less than a given distance.

20. The method of claim 15, wherein the playback speed is decreased when the measured distance is less than a given distance.

21. The method of claim 15, further comprising the step of restoring the length of a buffer storing the incoming speech packets to a nominal length, at a nominal playback speed, instead of at a higher playback speed, thereby compressing any silence intervals.

22. The method of claim 21, wherein the compressing step is performed when silence suppression is enabled in the VoIP system.

* * * * *